US010452064B1

(12) United States Patent
Ray et al.

(10) Patent No.: US 10,452,064 B1
(45) Date of Patent: Oct. 22, 2019

(54) PORTABLE UNIVERSAL GROUND CONTROL SYSTEM

(71) Applicants: Biraj Debin Ray, Scottsdale, AZ (US);
Joseph Burch, Phoenix, AZ (US);
Jeffry Holmquist, Surprise, AZ (US)

(72) Inventors: Biraj Debin Ray, Scottsdale, AZ (US);
Joseph Burch, Phoenix, AZ (US);
Jeffry Holmquist, Surprise, AZ (US)

( * ) Notice: Subject to any disclaimer, the term of this patent is extended or adjusted under 35 U.S.C. 154(b) by 60 days.

(21) Appl. No.: 15/626,359

(22) Filed: Jun. 19, 2017

Related U.S. Application Data

(60) Provisional application No. 62/365,311, filed on Jul. 21, 2016.

(51) Int. Cl.
*G05D 1/00* (2006.01)
*B64C 39/02* (2006.01)
*H04L 29/08* (2006.01)

(52) U.S. Cl.
CPC ......... *G05D 1/0016* (2013.01); *B64C 39/024* (2013.01); *G05D 1/0038* (2013.01); *H04L 67/125* (2013.01); *B60Y 2200/80* (2013.01); *B64C 2201/146* (2013.01)

(58) Field of Classification Search
None
See application file for complete search history.

(56) References Cited

U.S. PATENT DOCUMENTS

| | | | | |
|---|---|---|---|---|
| 2003/0206151 A1* | 11/2003 | Oross | ...................... | G05G 9/02 345/156 |
| 2011/0106339 A1* | 5/2011 | Phillips | ................ | G05D 1/0033 701/2 |
| 2014/0214239 A1* | 7/2014 | Bruck | .................. | G05D 1/0016 701/2 |
| 2017/0309088 A1* | 10/2017 | Arya | ................... | H04L 43/0811 |

OTHER PUBLICATIONS

"Bird Pilot—Ground Station", Feb. 29, 2016 (Year: 2016).*

* cited by examiner

*Primary Examiner* — Tyler J Lee
*Assistant Examiner* — Garrett F Evans
(74) *Attorney, Agent, or Firm* — Plager Schack LLLP; Mark H. Plager; Stephen Hallberg

(57) ABSTRACT

A portable integrated universal ground control system is disclosed that operates, pilots, and manages unmanned vehicles via integrated HOTAS flight controls, computer, wireless video receiving technology and a set of display screens. The portable integrated universal ground control system eliminates deep learning curves necessary to operate or pilot complex, commercial unmanned systems by offering streamlined hardware. The portable integrated universal ground control system also eliminates countless connectors, wires and work flows needed to pilot and operate unmanned systems.

12 Claims, 5 Drawing Sheets

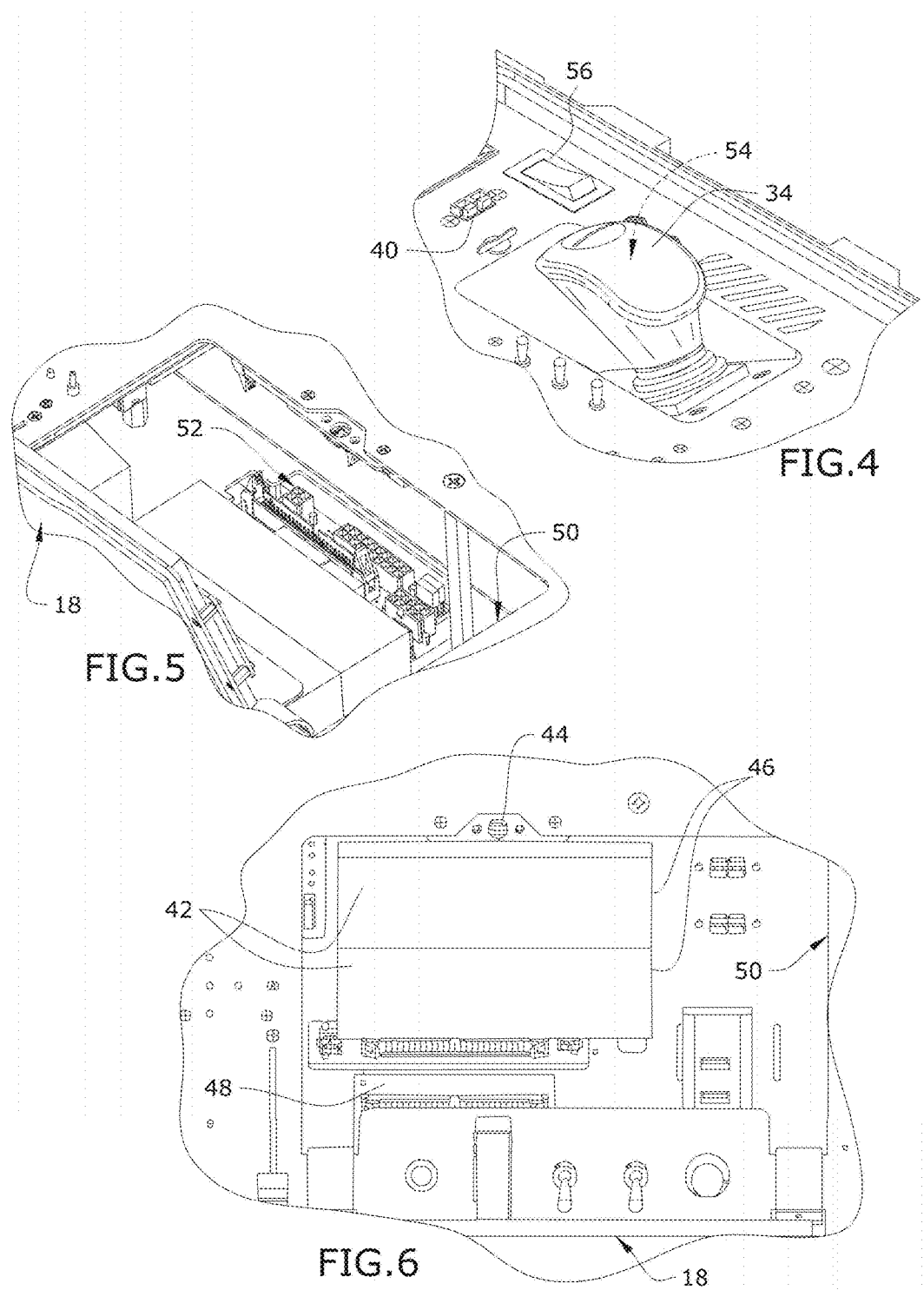

PORTABLE UNIVERSAL GROUND CONTROL SYSTEM

CLAIM OF BENEFIT TO PRIOR APPLICATION

This application claims benefit to U.S. Provisional Patent Application 62/365,311, entitled "Portable System That Pilots/Manages Unmanned Vehicles Via Integrated HOTAS Flight Controls, Computer, Wireless Video Receiving Technology And Two Displays," filed Jul. 21, 2016. The U.S. Provisional Patent Application 62/365,311 is incorporated herein by reference.

BACKGROUND

Embodiments of the invention described in this specification relate generally to controlling unmanned vehicles, and more particularly, to a portable, single form factor, universal ground control system to operate and manage unmanned vehicles in general, and to pilot, operate, and manage unmanned vehicles in particular, via integrated hands on throttle-and-stick (hereinafter abbreviated as "HOTAS") operational controls, computer, wireless video receiving technology, and multiple display screens.

Operating unmanned vehicles (hereinafter abbreviated as "UV" in the singular form or "UVs" in the plural form) generally, and piloting and managing unmanned aerial vehicles (hereinafter abbreviated as "UAV" in the singular form or "UAVs" in the plural form) in particular, typically involves the use of electronic components and software systems that allow for control of specific UVs or UAVs. Unfortunately, there are a number of compatibility issues between various electronic components and software systems needed to operate different UVs and/or to pilot and operate different UAVs.

Another problem with existing mechanisms for operating UVs and/or piloting and managing UAVs is that there is a lack of portability, resulting in transporting and operator/pilot training issues. Furthermore, the present ways to operate UVs or pilot and manage UAVs are typically based on devices that include overly complicated controls to operate complex UVs or pilot complex UAVs. Thus, extensive training and knowledge is typically needed to set up and connect all the necessary components to maneuver complex UVs or fly complex UAVs. The amount of time can be great, but typically at least thirty (30) minutes to an hour are needed to get pre-operation or pre-flight technology/workflows completed before operating a UV or piloting a UVA.

Therefore, what is needed is a universal portable mechanism to manage compatibility issues between various electronic components and software systems needed to operate, pilot, and manage different UVs and UAVs, which is not overly complex and works with a multitude of different types of UVs and UAVs and which involves a short learning curve for users of the system.

BRIEF DESCRIPTION

A novel universal ground control system is disclosed. In some embodiments, the universal ground control system includes a portable integrated hands on throttle-and-stick (HOTAS) and payload control system in a single form factor to operate an unmanned vehicle (UV). In some embodiments, the unmanned vehicle (UV) is an unmanned aerial vehicle (UAV) and the portable integrated hands on throttle-and-stick (HOTAS) and payload control system pilots and manages the UAV by way of the single form factor. In some embodiments, the single form factor comprises a heavy duty case that encapsulates a plurality of components that make up the portable integrated HOTAS and payload control system to eliminate connection and workflow issues needed to operate UVs and to pilot and manage UAVs. In some embodiments, the plurality of components of the portable integrated HOTAS and payload control system includes at least a plurality of display screens, a computing device, and a set of wireless video receiving circuitry that enable the display screens to present video received from at least one of a UV and a UAV In some embodiments, the portable integrated HOTAS and payload control system operates UVs and pilots and manages UAVs directly by operation of the integrated HOTAS flight controls, the embedded computing device (or personal computer "PC"), the wireless video receiving module, and at least two video display screens. As a single form factor-based system, the portable integrated HOTAS and payload control system eliminates deep learning curves necessary to operate or pilot complex, commercial unmanned systems because the overall design of the system offers highly streamlined hardware (in the single form factor). In some embodiments, the portable integrated HOTAS and payload control system is extended by cellular communication and satellite technology, further eliminating the many connectors, wires and work flows needed to pilot and/or operate unmanned systems.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
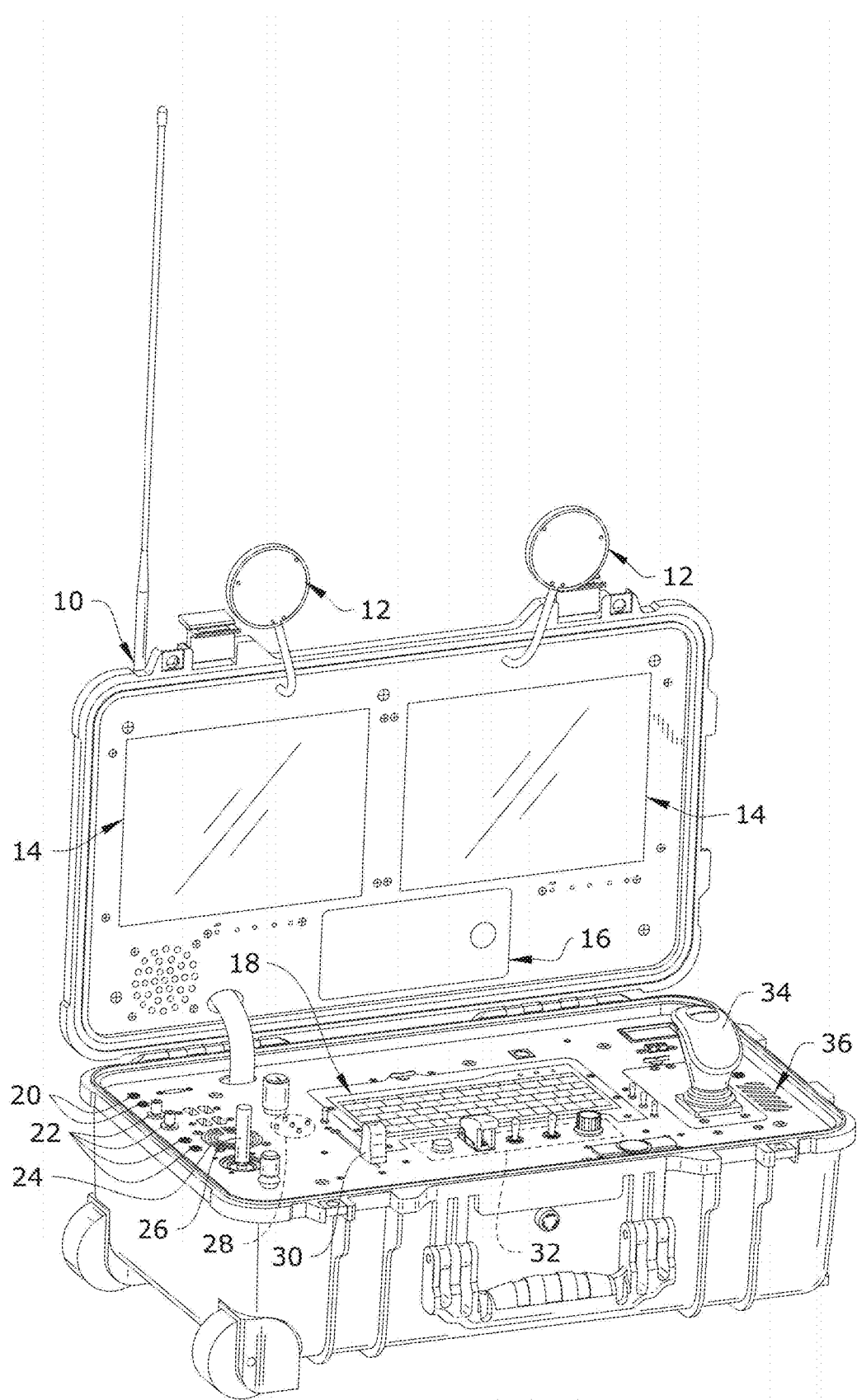

Having thus described the invention in general terms, reference is now made to the accompanying drawings, which are not necessarily drawn to scale, and which show different views of different example embodiments, and wherein:

FIG. 1 conceptually illustrates a perspective view of a portable integrated HOTAS and payload control system in some embodiments.

Figure 2:
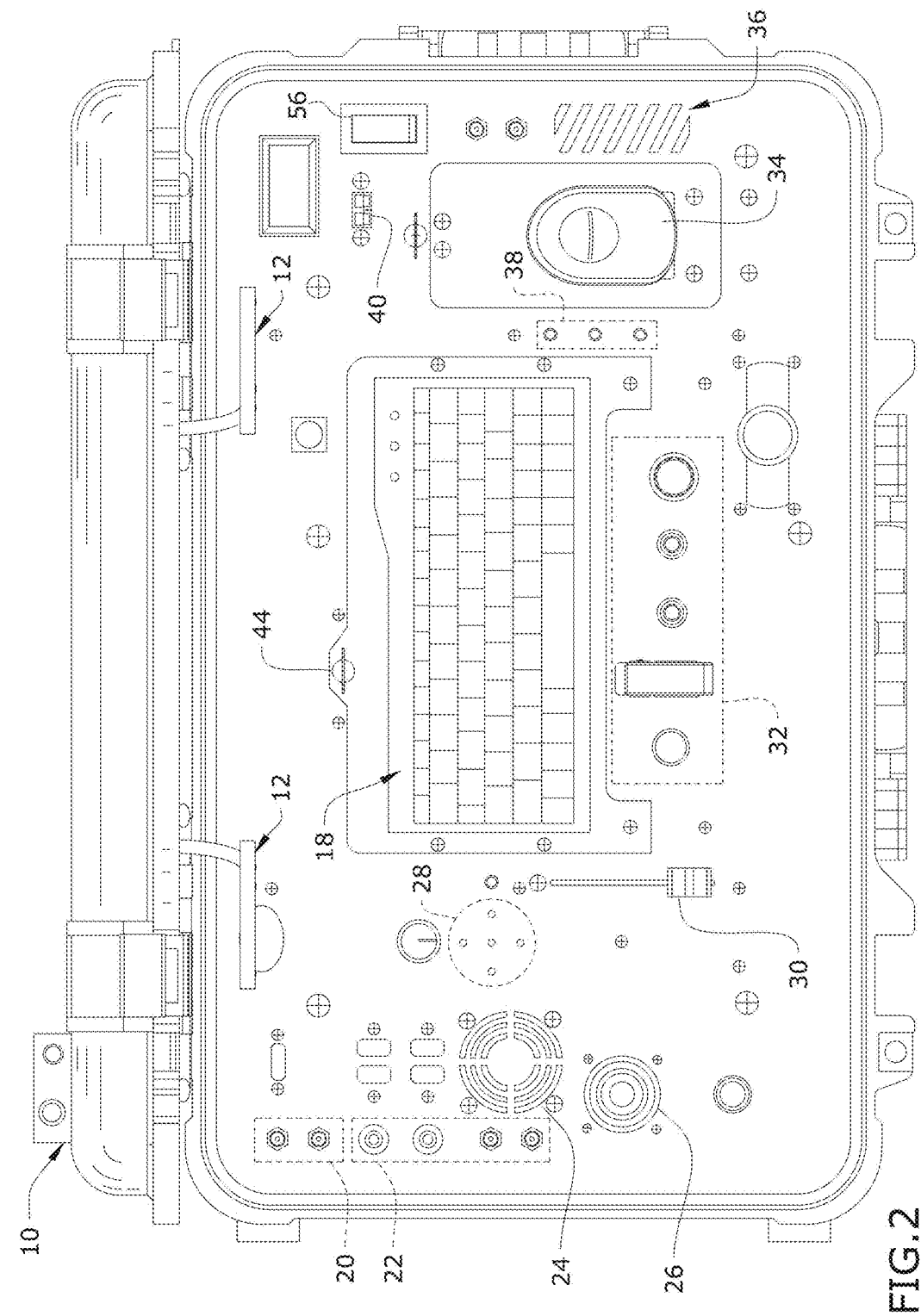

FIG. 2 conceptually illustrates a top view of the portable integrated HOTAS and payload control system in some embodiments.

Figure 3:
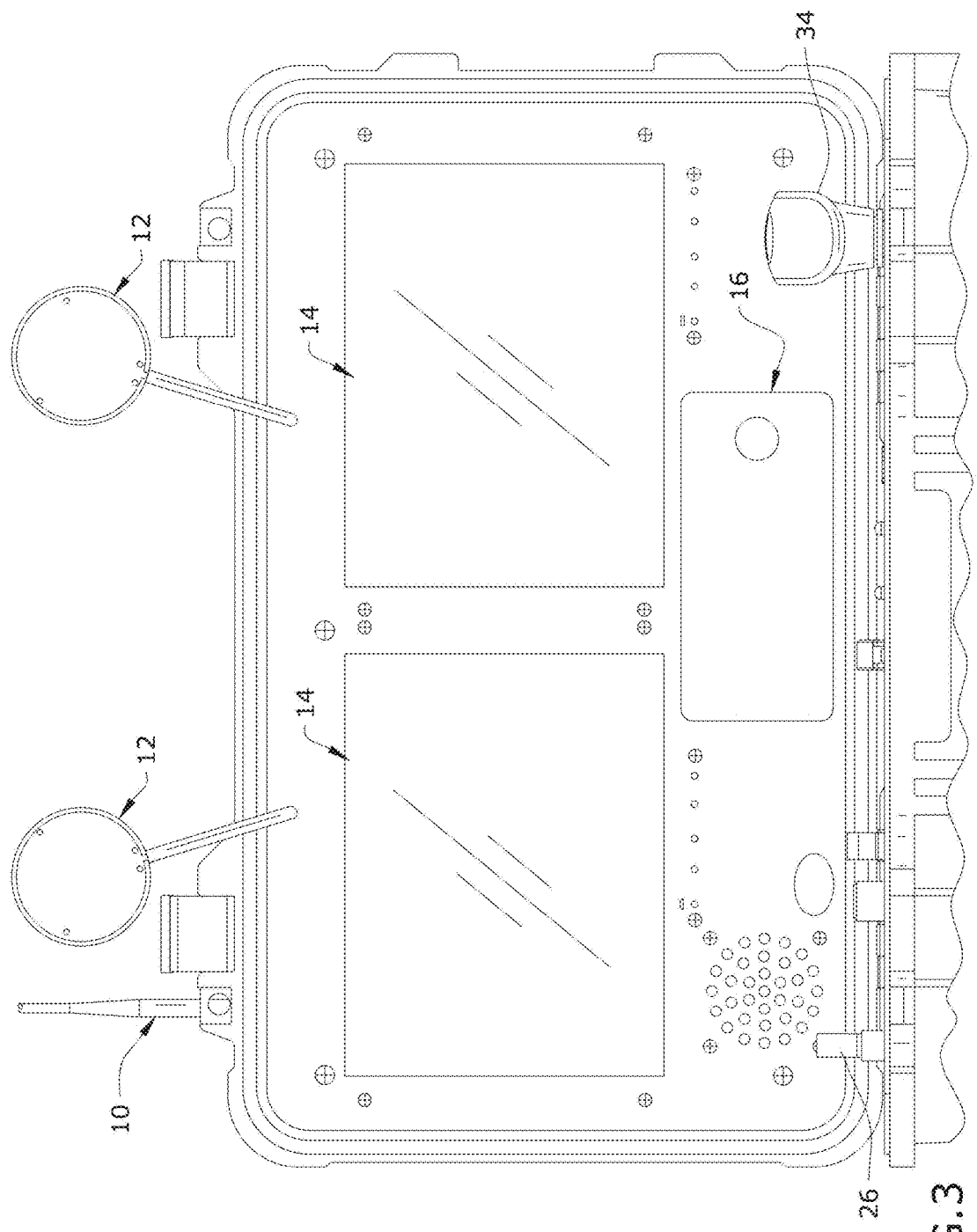

FIG. 3 conceptually illustrates a front view of the portable integrated HOTAS and payload control system in some embodiments.

FIG. 4 conceptually illustrates a detailed perspective view of the portable integrated HOTAS and payload control system in some embodiments demonstrating joystick in down position.

FIG. 5 conceptually illustrates a detailed perspective view of the portable integrated HOTAS and payload control system in some embodiments demonstrating keyboard in up position.

FIG. 6 conceptually illustrates a detailed top view of the portable integrated HOTAS and payload control system in some embodiments demonstrating keyboard in up position.

Figure 7:
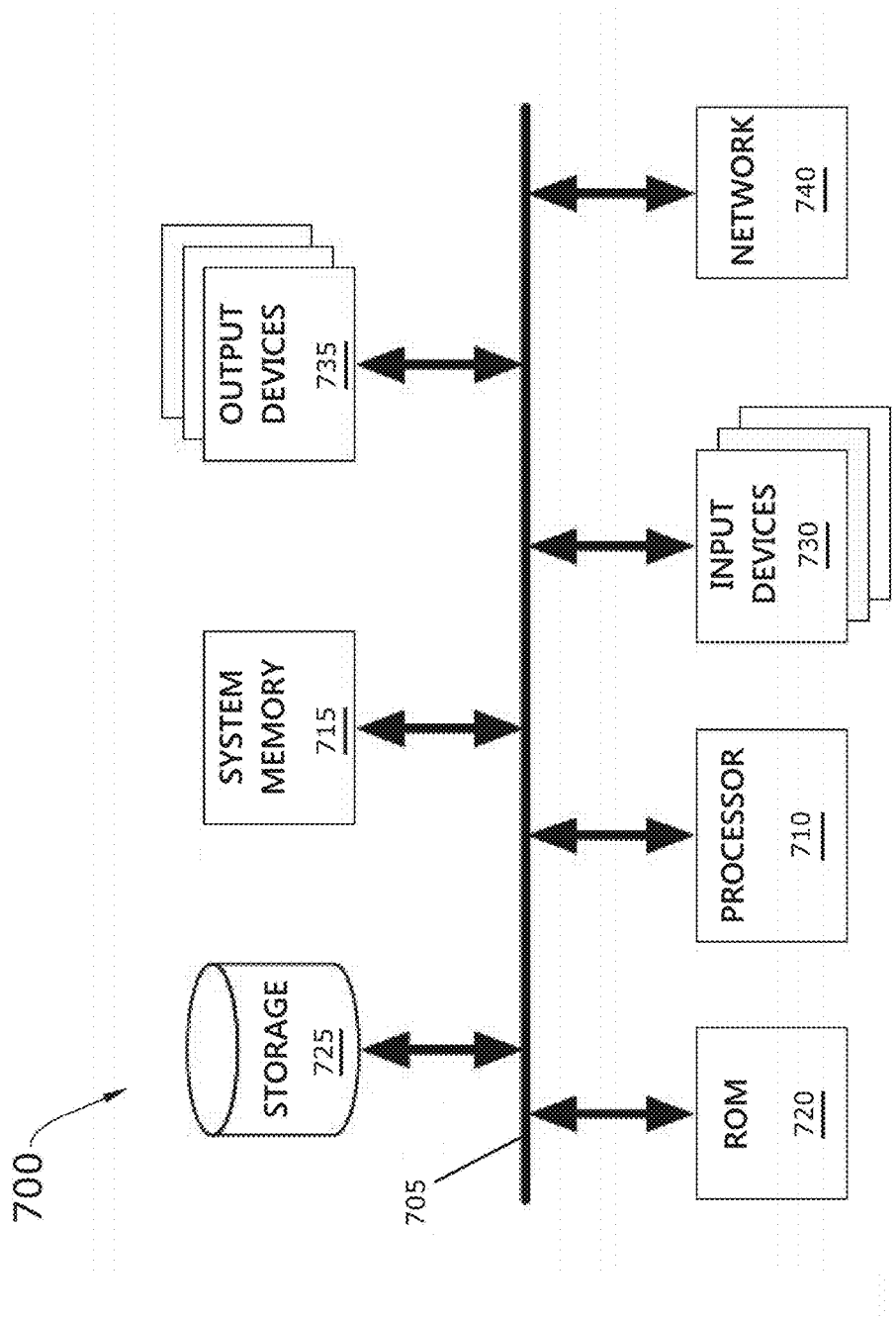

FIG. 7 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a portable universal ground control system comprising a portable integrated HOTAS and payload control system in a single form factor to operate an unmanned system comprising at least one of an unmanned vehicle (UV) and an unmanned aerial vehicle (UAV). In some embodiments, the single form factor comprises a heavy duty case that encapsulates a plurality of components that make up the portable integrated HOTAS and payload control system to eliminate connection and workflow issues needed to operate UVs and to pilot and manage UAVs. In some embodiments, the plurality of components of the portable integrated HOTAS and payload control system includes at least a plurality of display screens, a computing device, and a set of wireless video receiving circuitry that enable the display screens to present video received from at least one of a UV and a UAV In some embodiments, the portable integrated HOTAS and payload control system operates UVs and pilots and manages UAVs directly by operation of the integrated HOTAS flight controls, the embedded computing device (or personal computer "PC"), the wireless video receiving module, and at least two video display screens. As a single form factor-based system, the portable integrated HOTAS and payload control system eliminates deep learning curves necessary to operate or pilot complex, commercial unmanned systems because the overall design of the system offers highly streamlined hardware (in the single form factor). In some embodiments, the portable integrated HOTAS and payload control system is extended by cellular communication and satellite technology, further eliminating the many connectors, wires and work flows needed to pilot and/or operate unmanned systems.

As stated above, operating UVs and piloting and managing UAVs typically involves the use of electronic components and software systems that allow for control of specific UVs or UAVs. Unfortunately, there are a number of compatibility issues between various electronic components and software systems needed to operate different UVs and/or to pilot and operate different UAVs. Another problem with existing mechanisms for operating UVs and/or piloting and managing UAVs is that there is a lack of portability, resulting in transporting issues (e.g., lugging a multitude of disparate electronic and communication components, wires, connectors, etc., of a complex ground system to a site at which a UV or UAV will be operated or piloted) and operator/pilot training issues (e.g., the challenge of assembling of a complex ground system or the orderly disassembly of said system). Furthermore, the present ways to operate UVs or pilot and manage UAVs are typically based on devices that include overly complicated controls to operate complex UVs or pilot complex UAVs. Thus, extensive training and knowledge is typically needed to set up and connect all the necessary components of a ground system that allows a user to operate complex UVs or to fly complex UAVs. The amount of time is typically not negligible, often taking between thirty (30) minutes and sixty (60) minutes to get pre-operation or pre-flight technology, components, and workflows completely set up in working order before operating the unmanned vehicle.

Embodiments of the portable integrated HOTAS and payload control system described in this specification solve such problems by using advanced circuit boards and unique software programming that integrates all the necessary components and systems needed to operate complex UVs or pilot complex UAVs with ease. The heavy duty case of the portable integrated HOTAS and payload control system provides an encapsulation mechanism to provide an easy single form factor that solves portability, durability, and compatibility issues. In some embodiments, the portable integrated HOTAS and payload control system solves various compatibility issues between electronic components and software systems needed to operate UVs and pilot and manage UAVs. In some embodiments, the portable integrated HOTAS and payload control system solves portability, transporting, and operator/pilot training issues along with solving the issue of overly complicated controls to operate or pilot any of several types of complex unmanned systems, including complex unmanned vehicles (UVs) and complex unmanned aerial vehicles (UAVs).

Embodiments of the portable integrated HOTAS and payload control system described in this specification differ from and improve upon currently existing options for controlling unmanned vehicles and operating unmanned systems. In particular, some embodiments of the portable integrated HOTAS and payload control system differ by inclusion of the integrated HOTAS (hands on throttle and stick) and payload control with all the necessary components needed to operate a UV or pilot and manage a UAV in a single form factor. In some embodiments, the portable integrated HOTAS and payload control system also includes multiple display screens, a computing device, and wireless video receiving technology all in one unit. For example, the components of the portable integrated HOTAS and payload control system can be encapsulated in the heavy duty case to provide exceptional portability options for operators, users, training personnel, trainees, etc.

To date, no other option for controlling unmanned vehicles and operating unmanned systems has offered or offers the advanced circuitry, software and features that the portable integrated HOTAS and payload control system offers in a single portable unit. In addition, some embodiments of the portable integrated HOTAS and payload control system improve upon the currently the existing options because all of the components of existing ground systems for controlling unmanned vehicles and operating unmanned systems use different voltages and software systems along with using ergonomics designed over sixty years ago. The learning curves are too high for many newer operators or trainees and extremely confusing to set up before operation of the UV or flight of the UAV, even for users with significant experience working with unmanned systems and their controls. In contrast, the portable integrated HOTAS and payload control system of some embodiments eliminates deep learning curves necessary to operate, manage, or pilot complex, commercial unmanned systems by offering streamlined hardware in a single form factor.

In some embodiments, the portable integrated HOTAS and payload control system includes cellular modems, satellite technology, and wireless controls that provide wireless communication technology. In particular, the portable integrated HOTAS and payload control system of some embodiments can be controlled by one or more of Orthogonal Frequency Division Multiplex (OFDM) or Orthogonal Frequency Division Multiple Access (OFDMA), Wi-Fi, spread spectrum, Code Division Multiple Access (CDMA) time division multiplexed (TDM), Time Division Multiple Access (TDMA) and Global Mobile System (GSM) processors and baseband filters for providing OFDM, OFDMA, TDM, TDMA, Bluetooth, spread spectrum CDMA and GSM system signals, as well as other possible wireless technologies and signals for which the portable integrated HOTAS and payload control system can be adapted to work with. In this way, the portable integrated HOTAS and payload control system enables communication over wireless networks, cellular networks, etc., and provides tracking via GPS, thereby eliminating countless connectors, wires, and work flows needed in existing options for controlling unmanned systems.

Furthermore, some embodiments of the portable integrated HOTAS and payload control system can be adapted to portable field power devices and/or charging systems. Additionally, some embodiments of the portable integrated HOTAS and payload control system include innovative features such as antenna tracking units and ultra high frequency (UHF) compatible units. A big innovation of at least some embodiments of the portable integrated HOTAS and payload control system over existing options for controlling unmanned systems is that users of the portable integrated HOTAS and payload control system have operation or flight controls automatically connected to a computing device that is embedded within the single form factor. In some embodiments, an embedded computer is tucked away in a hatch of the heavy duty case (under the control apparatuses, devices, and switches) of the portable integrated HOTAS and payload control system of some embodiments. In some embodiments, the embedded computer includes software programs and applications to operate UVs or to control, pilot, manage, and operate UAVs through the portable integrated HOTAS and payload control system. In some embodiments, customer software programs are uploaded to one or more micro-controller registers or memory storage devices that are communicably connected to the embedded computer. In some embodiments, the custom software programs can be installed and operate on one or more processors of the embedded computer to provide operational control of UVs or flight control of UAVs. In this way, companies that operated unmanned vehicles will be able to further design software around our ground control system.

The portable integrated HOTAS and payload control system of the present disclosure may be comprised of the following elements. This list of possible constituent elements is intended to be exemplary only and it is not intended that this list be used to limit the portable integrated HOTAS and payload control system of the present application to just these elements. Persons having ordinary skill in the art relevant to the present disclosure may understand there to be equivalent elements that may be substituted within the present disclosure without changing the essential function or operation of the portable integrated HOTAS and payload control system.

1. Unique Printed Circuit Boards
2. Integration and Transmitter Software
3. Heavy Duty Case
4. Two LED Sunlight Viewable display screens (anti-glare sunlight viewable LED display screens)
5. Embedded PC
6. HOTAS (Hands on throttle and stick) Configuration
7. Payload/Camera Gimbal Joystick
8. Universal Video Receiver Dock (e.g., a wireless video receiver dock)
9. Universal Transmitter Module Dock
10. Cellular and Satellite Connectivity (optional)
11. Universal Battery Bay w/Simple Charging
12. On Screen Display Overlay The various elements of the portable integrated HOTAS and payload control system of the present disclosure may be related in the following exemplary fashion. It is not intended to limit the scope or nature of the relationships between the various elements of the portable integrated HOTAS and payload control system and the following examples are presented as illustrative examples only.

All components, switches, connectors, etc., plug into one or more custom printed circuit board (PCB). The components, switches, connectors, etc., all receive the correct voltages and signals from the PCBs along with the software code to produce a pulse position modulation (PPM) signal that is transmitted out of a port to a UHF transmitter or point-to-point modem that is bound to an unmanned vehicle or unmanned aerial vehicle. The portable integrated HOTAS and payload control system uses various types of potentiometers wired into the PCBs which translates into the outgoing PPM signal. The processor also puts a video overlay on at least one of the display screens which shows visual output of different functions enabled on the portable integrated HOTAS and payload control system. The video overlay also serves provides a visible control menu and settings for the entire portable integrated HOTAS and payload control system. In some embodiments, the portable integrated HOTAS and payload control system includes a video receiver bay that takes in wireless video signals from the UVs or UAVs and thereafter visually outputs the received video on at least one of the display screens. The embedded computer or embedded PC runs all the propriety software depending on the type of unmanned vehicle or unmanned aerial vehicle in use. In some embodiments, at least one joystick is a flight control joystick that operates along three axises.

Several views of several configurations of the portable integrated HOTAS and payload control system are described next. Specifically, the portable integrated HOTAS and payload control system is shown in a closed configuration with the sets of controls visible from within the single form factor case that encompasses the portable integrated HOTAS and payload control system. In some embodiments, a hatch panel/keyboard attachment panel is included which uses canceled hinges that flip outward so one can access the inside of the ground control system very easily. An operator can install cellular or satellite modems, switch out batteries, replace fuses, battery connectors, etc., when the operator turns a button that allows for the keyboard to flip open. The portable integrated HOTAS and payload control system is shown in the closed configuration and described next by reference to FIGS. 1-3. By contrast, when the hatch panel/keyboard attachment panel is flipped open, the portable integrated HOTAS and payload control system reveals several components including at least an embedded computing device (microprocessor 48) and battery/power source for the portable integrated HOTAS and payload control system. The portable integrated HOTAS and payload control system is shown in an open configuration, and is described in the open configuration below by reference to FIGS. 5-6.

Turning first to the closed configuration views, FIG. 1 conceptually illustrates a perspective view of a portable integrated HOTAS and payload control system in some embodiments. As shown in this figure, the portable integrated HOTAS and payload control system includes a radio transmitter and antenna controller 10, a pair of wireless video antennas and connectors 12, a pair of anti-glare sunlight viewable LED display screens 14, a wireless video receiver dock 16, a keyboard/touch screen panel 18, a set of radio transmitter outputs 20, spare auxiliary connectors 22, an output ventilation system 24, two-axis gimbal/payload controls 26, navigation for desert rotor GCS smartview 28, a throttle slide 30, a customizable switch array 32, a foldable three-axis hall effect joystick 34, and an input ventilation system 36.

Turning to another closed configuration view, FIG. 2 conceptually illustrates a top view of the portable integrated HOTAS and payload control system in some embodiments. As shown in this figure, the portable integrated HOTAS and payload control system includes the radio transmitter and antenna controller 10, the pair of wireless video antennas and connectors 12, the keyboard/touch screen panel 18, the set of radio transmitter outputs 20, the spare auxiliary connectors 22, the output ventilation system 24, the two-axis gimbal/payload controls 26, the navigation for desert rotor GCS smartview 28, the throttle slide 30, the customizable switch array 32, the foldable three-axis hall effect joystick 34, the input ventilation system 36, a set of trim switches 38, power system connectors 40, a hatch system 44, and a power switch 56.

By way of another closed configuration example, FIG. 3 conceptually illustrates a front view of the portable integrated HOTAS and payload control system in some embodiments. As shown in this figure, the portable integrated HOTAS and payload control system includes the radio transmitter and antenna controller 10, the pair of wireless video antennas and connectors 12, the pair of anti-glare sunlight viewable LED display screens 14, the wireless video receiver dock 16, the two-axis gimbal/payload controls 26, and the foldable three-axis hall effect joystick 34.

In some embodiments, the three-axis Hall Effect joystick 34 is foldable in order to provide clearance for the pelican case top to close down. In other words, the three-axis joystick 34 is a sizable component which typically would prevent the heavy duty case from being closed. This would have the effect of limiting the portability, security, and safety of the portable integrated HOTAS and payload control system. To remedy this problem and still provide a three-axis joystick that is of typical size, the three-axis hall effect joystick 34 of some embodiments folds down to provide clearance on the deck for the pelican case top to close and completely shut the heavy duty case. Similarly, when the heavy duty case of the portable integrated HOTAS and payload control system is opened to operate a UV or pilot a UAV, the user folds up the three-axis hall effect joystick 34 which snaps and locks into place (needing extra force to fold back down).

By way of example, FIG. 4 conceptually illustrates a detailed perspective view of the portable integrated HOTAS and payload control system in some embodiments demonstrating the three-axis Hall Effect joystick 34 in down position 54. As shown in this figure, the portable integrated HOTAS and payload control system includes the three-axis Hall Effect joystick 34, the power system connectors 40, and the power switch 56. In some embodiments, the three-axis Hall Effect joystick 34 is mounted on a panel that collapses into the case to allow for proper clearances when the heavy duty case (also called a pelican case) is closed. This unique design allows users to offer a full size three-axis joystick which can collapse to make enough clearance room to close the pelican case. As shown in this figure, the foldable three-axis hall effect joystick 34 is collapsing (shown by dashed line) into the down position 54, thereby allowing the deck to be cleared to close the pelican case cover. The power switch 56 is not required to be, but is preferably turned off when collapsing the foldable three-axis hall effect joystick 34 into the down position 54. This provides a simple way close the heavy duty case top (pelican case) of the portable integrated HOTAS and payload control system.

As noted above, the portable integrated HOTAS and payload control system reveals components in an open configuration when the hatch/keyboard is flipped up and opened. Specifically, in the open configuration, the portable integrated HOTAS and payload control system opens a hatch panel/keyboard panel that reveals the embedded computing device enclosed within the heavy duty case (pelican case) that forms the encapsulated single form factor for the portable integrated HOTAS and payload control system. Further details of the portable integrated HOTAS and payload control system in the open configuration are described next by reference to FIGS. 5-6.

By way of an open configuration example, FIG. 5 conceptually illustrates a detailed perspective view of the portable integrated HOTAS and payload control system in some embodiments demonstrating the keyboard 18 in up position. This is the open configuration which reveals embedded components of the portable integrated HOTAS and payload control system. In particular, as shown in this figure, the portable integrated HOTAS and payload control system includes the keyboard/touch screen panel 18, an auxiliary component dock 50, and 125 watt power distribution with fuses 52 when the hatch panel/keyboard panel is flipped open.

Now turning to another example of an open configuration, FIG. 6 conceptually illustrates a detailed top view of the portable integrated HOTAS and payload control system in some embodiments demonstrating the keyboard 18 in up position to reveal the embedded components. As shown in this figure, the portable integrated HOTAS and payload control system includes the keyboard/touch screen panel 18, two parallel lithium batteries 42, the hatch system 44, parallel battery connectors 46, a custom microprocessor/chip set 48, and the auxiliary component dock 50.

The portable integrated HOTAS and payload control system of the present disclosure generally works when one plugs in the batteries 42 and turns the power switch 56 on to power up the portable integrated HOTAS and payload control system. The voltage goes through fuses 52 and regulators on custom designed circuit boards (e.g., custom microprocessor/chip set 48) that push very specific voltage (e.g., 125 watt power distribution) and signals to each component. The custom circuit boards and microprocessor are designed to push the information and voltage resistance uniquely around the portable integrated HOTAS and payload control system to power a unique combination of components. The microprocessor 48 controls the signals that come off of switches, dials, joysticks, etc., that all have potentiometers. The microprocessor 48 also controls the information and settings of the portable integrated HOTAS and payload control system and visually outputs information and video onto at least one of the display screens as a video overlay. The custom microprocessor 48 also creates the PPM signal that is fed into a UHF output transmitter (e.g., at least one of the radio transmitter outputs 20). The voltage also powers the internal embedded PC. The output of the PC is shown on at least one of the display screens (e.g., the second display screen when the first display screen is in use). The PC provides internet connectivity and runs proprietary unmanned system software that an operator may need to operate specific vehicles or a pilot may need to fly specific aerial vehicles. The display screen(s), keyboard, and an optional mouse plugs into a USB hub inside of the portable integrated HOTAS and payload control system (e.g., under the hatch system 44). In some embodiments, the portable integrated HOTAS and payload control system includes a four button navigation layout to shuffle through and change the various settings of the portable integrated HOTAS and payload control system.

In some embodiments, the voltage can also power a UHF output device or point-to-point modem. The portable integrated HOTAS and payload control system essentially takes the flight control/operational switches and joysticks and puts their positioning in a format that the UHF output device understands and then transmits it to the unmanned vehicle or unmanned aerial vehicle so an operator or pilot can operate or pilot an unmanned vehicle or an unmanned aerial vehicle using simple natural operational or flight controls and the necessary components all connected and in one form factor.

The portable integrated HOTAS and payload control system has a custom microprocessor 48 to run the various software programs (coded applications, embedded or loaded) and to manage all the components. The microprocessor 48 uses a wide variety of software logic to keep the portable integrated HOTAS and payload control system running. If-then relationships, subroutines are all utilized by the portable integrated HOTAS and payload control system.

To make the portable integrated HOTAS and payload control system of the present disclosure, one would include integrated flight controls, embedded PC, wireless video receivers and various other components and features universal to operating unmanned vehicles or piloting unmanned aerial vehicles. One may also design and develop the software that allows for use of potentiometers that translate into a protocol that UHF output devices understand. One may then design the microprocessor and printed circuit boards to integrate/control all the various components and control their voltages and signals, and then design the physical form factor in, e.g., computer aided design (CAD) software. To ensure all components will work with each other and everything fits together, one may rely on external testing or self-testing. After finishing the design process, laser cutters may be used to stamp out all the aluminum parts and panels needed for the single form factor of the portable integrated HOTAS and payload control system. For instance, one may use panels that are anodized or power coated and cut uniquely to accommodate the portable integrated HOTAS and payload control system. One may then create PCB designs to get the circuit boards and processor printed (manufactured). Then solder various components, connectors and wires together. Finally, install the aluminum casing and components inside of a heavy duty field case.

Among the elements of the portable integrated HOTAS and payload control system in the single form factor are the custom printed circuit boards and unique software code for the custom microprocessor to run everything. The custom cut aluminum panels and parts assist in keeping everything together in encapsulated single form (all-inclusive in open or closed configuration). Also included in the portable integrated HOTAS and payload control system are the various types of potentiometers, at least two display screens, two joysticks, buttons, switches and dials that pilot the unmanned vehicle. The embedded computing device (or PC) is included for users to be able to run their own proprietary software while operating or piloting their vehicle. The battery packs and voltage regulators are included to keep the portable integrated HOTAS and payload control system on and antennas to pick up the wireless video band. The custom on-screen overlay that visually outputs the status and settings of the system on a video overlay are also included.

Other components of the portable integrated HOTAS and payload control system include an optional 4G/LTE cellular module (or cellular radio, optionally upgradeable to other cellular modules as cellular technology improves and advances), a sunlight viewable feature on at least one of the display screens or both of the display screens, a type of transmitter UHF module and type of video receiver and antennas. The portable integrated HOTAS and payload control system is also designed to take a variety of different battery packs, including, without limitation, lithium ion batteries, lithium polymer batteries, and lithium phosphate batteries, among others. While the types of batteries presented in this disclosure are implemented with the present portable integrated HOTAS and payload control system, a person skilled in the relevant art will appreciate that other such batteries can be used by the portable integrated HOTAS and payload control system as battery technology continues to develop.

Similarly, many other components of the portable integrated HOTAS and payload control system include different versions or features of certain available components, but may be compatible with future developed components. As such, the portable integrated HOTAS and payload control system has a number of components that can be switched out for just a different version or type of component.

In some embodiments, the portable integrated HOTAS and payload control system includes components, elements, and circuits that allow for battery charging. In some embodiments, the portable integrated HOTAS and payload control system includes optical potentiometers and one or more additional joysticks to enhance functionality of the portable integrated HOTAS and payload control system while a user is operating a UV or piloting a UAV.

To use the portable integrated HOTAS and payload control system of the present disclosure, one would simply turn the single form factor unit on (e.g., via power switch 56) and begin using it to control, operate, or pilot a UV or a UAV. Overall, the single form factor and integrated components work closely together to dramatically bring down setup time (e.g., from 30-45 minutes to just the time it takes to push the on button which is just a few seconds).

Another major issue the portable integrated HOTAS and payload control system solves is the issue of having to use over complicated flight controls and operations. Using the foldable three-axis Hall Effect joystick 34 for flight controls solves the issue of having to go through a high learning curve of training using archaic remote control transmitters designed decades ago.

The payload controls of the portable integrated HOTAS and payload control system in some embodiments solve the issue of not needing to use cumbersome buttons, dials, and slides to control the payload/gimbal system which typical unmanned aircraft have. The integrated two-axis joystick 26 for payload makes the experience conceptually and logistically easier to operate.

The embedded PC, video receiver dock, battery dock and UHF dock turns the portable integrated HOTAS and payload control system into a universal system for users to customize yet still be within all the technical parameters, such that compatibility among the components is maintained at a very high level. Users of the portable integrated HOTAS and payload control system do not need to carry a laptop along with countless components to connect to and operate a UV or pilot a UAV. For instance, when users turn on the portable integrated HOTAS and payload control system (e.g., via power switch 56), they instantly get an "on" screen display overlay on one of the display screens 14. This overlay offers a range of information of the portable integrated HOTAS and payload control system to the user while operating or piloting unmanned vehicles. This information is currently unavailable to users because their ground operations include multiple non-integrated components.

Additionally, some embodiments of the portable integrated HOTAS and payload control system combines/integrates three major technologies, including a computing device (the personal computer or "PC"), the radio transmitter, and the wireless video receiving unit. One can use the portable integrated HOTAS and payload control system for any application under those three major technologies. For example, the portable integrated HOTAS and payload control system may be deployed for surveillance missions, robotics and automated machine tasks, unmanned ground vehicles (cars/trucks), etc. The variety of deployments, implementations, and applications that can be utilized by the portable integrated HOTAS and payload control system is essentially endless and covers a wide swath of fields.

Also, the portable integrated HOTAS and payload control system of some embodiments may include adaptations for portable field power and/or battery charging systems, antenna tracking units, and UHF (or other radio) innovation. The portable integrated HOTAS and payload control system may continually innovate and expand in use based on software form as users will have their flight controls automatically connected to the embedded computing device. Companies that operate unmanned vehicles will be able to further design software around the ground control system.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 7 conceptually illustrates an electronic system 700 with which some embodiments of the invention are implemented. The electronic system 700 may be a computer, phone, PDA, or any other sort of electronic device. Such an electronic system includes various types of computer readable media and interfaces for various other types of computer readable media. Electronic system 700 includes a bus 705, processing unit(s) 710, a system memory 715, a read-only 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a floppy disk or a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the user to communicate information and select commands to the electronic system. The input devices 730 include alphanumeric keyboards and pointing devices (also called "cursor control devices"). The output devices 735 display images generated by the electronic system 700. The output devices 735 include printers and display devices, such as cathode ray tubes (CRT) or liquid crystal displays (LCD). Some embodiments include devices such as a touchscreen that functions as both input and output devices.

Finally, as shown in FIG. 7, bus 705 also couples electronic system 700 to a network 740 through a network adapter (not shown). In this manner, the computer can be a part of a network of computers (such as a local area network ("LAN"), a wide area network ("WAN"), or an intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, several different design configurations beyond the example configurations described above by reference to FIGS. 1-6 are possible to enjoy the functional benefits of the universal ground control system and the portable integrated HOTAS and payload control system. Thus, one of ordinary skill in the art would understand that the invention is not to be limited by the foregoing illustrative details, but rather is to be defined by the appended claims.

We claim:

1. A universal ground control system comprising:
   a heavy duty case that encapsulates a plurality of components of a portable integrated hands on throttle and stick (HOTAS) and payload control system;
   a plurality of display screens positioned along an inner pelican case cover of the heavy duty case;
   a plurality of LED sunlight viewable display screens;
   an embedded computing device comprising a processor on which integrated software runs to provide unmanned vehicle control and wireless video stream reception and display on the plurality of display screens;
   a three-axis joystick to wirelessly and remotely control movement of the unmanned vehicle;
   a payload/camera gimbal joystick to wirelessly and remotely control a direction of a field of view of a video camera that is attached to the unmanned vehicle to capture and stream video;
   a universal video receiver dock comprising a set of wireless video receiving circuitry that enable the display screens to visually output video received from the video camera mounted on the unmanned vehicle and controlled wirelessly by a user interacting with the payload/camera gimbal joystick;
   a keyboard to provide alpha-numeric keyboard-based input;
   a foldable hatch keyboard panel on which the keyboard is displaced to provide a level surface for the user to interact with the keyboard to provide alpha-numeric keyboard-based input; and
   a battery power source to provide power for the portable integrated HOTAS and payload control system.

2. The universal ground control system of claim 1 further comprising:
   a unique printed circuit board that controls the signal processing and power distribution of the portable integrated HOTAS and payload control system; and
   a universal transmitter module dock that transmits control signals to the unmanned vehicle based on user interaction with at least one of the three-axis joystick and the payload/camera gimbal joystick.

3. The universal ground control system of claim 2, wherein the unmanned vehicle comprises an unmanned aerial vehicle, wherein the unique printed circuit board controls analog and digital signal processing that is compatible with a plurality of other unmanned aerial vehicles that process one of digital signals and analog signals.

4. The universal ground control system of claim 3, wherein the universal transmitter module dock transmits flight control signals to the unmanned aerial vehicle based on user interaction with the three-axis joystick, said flight control signals transmitted as pulse position modulation (PPM) signals created by the processor, each PPM signal individually translated by at least one potentiometer of a plurality of potentiometers wired into the unique printed circuit board in connection with each of the other unmanned aerial vehicles in the plurality of other unmanned aerial vehicles.

5. The universal ground control system of claim 3, wherein the universal transmitter module dock transmits video camera control signals to the video camera attached to the unmanned aerial vehicle based on user interaction with the payload/camera gimbal joystick.

6. The universal ground control system of claim 2, wherein the unmanned vehicle comprises an unmanned land vehicle.

7. The universal ground control system of claim 6, wherein the universal transmitter module dock transmits operational control signals to the unmanned land vehicle based on user interaction with the three-axis joystick.

8. The universal ground control system of claim 6, wherein the universal transmitter module dock transmits video camera control signals to the video camera attached to the unmanned land vehicle based on user interaction with the payload/camera gimbal joystick.

9. The universal ground control system of claim 1 further comprising an on-screen display overlay that visually outputs a set of information pertaining to the portable integrated HOTAS and payload control system on a first display screen of the plurality of display screens, wherein video is visually output on a second display screen of the plurality of display screens.

10. The universal ground control system of claim 1, wherein the three-axis joystick is a foldable three-axis joystick that is revealed in an upright position when the pelican case cover of the heavy duty case is opened, wherein the three-axis joystick folds to a down position to clear space when the pelican case cover of the heavy duty case is closed.

11. The universal ground control system of claim 1, wherein the foldable hatch keyboard panel provides the flat surface for the user to interact with the keyboard when the foldable hatch keyboard panel is closed.

12. The universal ground control system of claim 1, wherein the foldable hatch keyboard panel reveals the embedded computing device when the foldable hatch keyboard panel is opened.

\* \* \* \* \*